(12) United States Patent
Fitch et al.

(10) Patent No.: US 8,117,071 B1
(45) Date of Patent: Feb. 14, 2012

(54) METHOD AND SYSTEM FOR MATCHING VIA AN IMAGE SEARCH QUERY AT A POINT OF SALE

(75) Inventors: Todd Matthew Fitch, Santa Clara, CA (US); John Reed Flora, Pleasanton, CA (US); Benjamin R. Weiss, Portola Valley, CA (US); Roy Goldman, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 480 days.

(21) Appl. No.: 12/112,545

(22) Filed: Apr. 30, 2008

(51) Int. Cl.
G06Q 20/00 (2006.01)
G06K 7/10 (2006.01)

(52) U.S. Cl. .......... 705/23; 705/16; 705/20; 235/462.01

(58) Field of Classification Search .................... 705/16, 705/20, 23
See application file for complete search history.

(56) References Cited

U.S. PATENT DOCUMENTS

| | | | | | |
|---|---|---|---|---|---|
| 5,497,314 | A | * | 3/1996 | Novak | 705/17 |
| 5,969,317 | A | * | 10/1999 | Espy et al. | 235/378 |
| 6,219,438 | B1 | * | 4/2001 | Giordano et al. | 382/110 |
| 6,592,033 | B2 | * | 7/2003 | Jennings et al. | 235/385 |
| 6,865,302 | B2 | | 3/2005 | Chang | |
| 7,118,026 | B2 | * | 10/2006 | Harris et al. | 235/375 |
| 7,287,694 | B2 | * | 10/2007 | Banavar et al. | 235/383 |
| 7,578,442 | B2 | * | 8/2009 | Knowles et al. | 235/462.01 |
| 7,631,808 | B2 | * | 12/2009 | Kundu et al. | 235/383 |
| 2002/0096564 | A1 | * | 7/2002 | Bellis et al. | 235/383 |
| 2002/0194074 | A1 | * | 12/2002 | Jacobs | 705/16 |
| 2007/0278298 | A1 | * | 12/2007 | Ali | 235/383 |

OTHER PUBLICATIONS

Garry, Michael. Watchful Eyes ( video surveillance equipment installed in supermarkets to prevent food loss). Supermarket News , v 56 , n 8 , p. NA. Feb. 25, 2008.*
Ferrone, C., A Brief Look at Visual Search Technology, Nov. 17, 2006, 5 pages.
Lai, W., Chang, E., and Cheng, K., An Anatomy of a Large-scale Image Search Engine, 2002, 4 pages.
Chen, S., Srinivas, S., Shyu, M., and Kashyap, R.L., An Indexing and Searching Structure for Multimedia Database Systems, IS&T/SPIE Conference on Storage and Retrieval for Media Databases 2000, Jan. 23-28, 2000, San Jose, CA, U.S.A, 6 pages.
Ward, A. A., et al. Collage and Content-Based Image Retrieval: Collaboration for Enhanced Services for the London Guildhall Library, Proceedings from Museum and the Web 2001, Mar. 14-17, 2001, Seattle, Washington, U.S.A., 18 pages. Mascio, T. D., Frigioni, D., and Tarantino, L., Evaluation of VISTO: A New Vector Image Search Tool (Abstract), Aug. 24, 2007, 1 page.
Arrington, M., Riya's Like.com is First True Visual Image Search, Nov. 8, 2006, 4 pages.
Chang, E. Y., et al. Statistical Learning for Effective Visual Information Retrieval, 2003 IEEE International Conference on Image Processing, Sep. 14-17, 2003, Barcelona, Spain, 4 pages.

* cited by examiner

Primary Examiner — Scott Zare
(74) Attorney, Agent, or Firm — Osha • Liang LLP

(57) ABSTRACT

A method for matching an unknown product to an offered product profile at a point of sale involves obtaining a first sensory input from the unknown product, where the first sensory input comprises at least a portion of an image, assigning a value to one or more characteristics of the first sensory input, searching a first product repository for a matching product profile using a pre-defined range based on the value of the one or more characteristics of the first sensory input, identifying the matching product profile on the first product repository when the offered product profile is within the pre-defined range, wherein the matching product profile includes a plurality of product information data, and conducting a transaction at the point of sale using the plurality of product information data.

25 Claims, 5 Drawing Sheets

US 8,117,071 B1

METHOD AND SYSTEM FOR MATCHING VIA AN IMAGE SEARCH QUERY AT A POINT OF SALE

BACKGROUND OF INVENTION

In order to effectively conduct business, merchants require a point of sale system that can obtain correct product information in an efficient manner. This is particularly true for retail and wholesale merchants, who often sell a wide variety of products, and for distributors of regulated products, such as healthcare providers, liquor stores, gun stores, etc. It is not uncommon, however, for item identification tags or codes to be damaged or lost as a result of handling by customers and/or employees. In those circumstances, an employee must retrieve a second product with intact identification or the operator at the point of sale must guess at a price.

Similarly, merchants and other distributors of consumer products need an effective inventory system in place. Again, in order for any inventory system to be effective, the system must efficiently and correctly identify products moving through the distribution chain and being sold to customers. Ideally, the same system that tracks incoming product shipments also tracks customer sales. These records are regularly reconciled. In the context of regulated industries, for example prescription drugs, an inventory system may serve a secondary quality control function to identify when products disappear or are provided incorrectly, and/or assist in product recalls.

Most consumer items contain many visual and non-visual cues to help determine the identity of the item. Example of these cues may include labels, appearance, and weight, among many others. Technology is currently available that can efficiently obtain, analyze, and search databases using image data and other sensory input. Moreover, point of sale terminals are easily adapted to obtain digital images of products, as well as other sensory input.

SUMMARY OF INVENTION

In general, in one aspect, the invention relates to a method for matching an unknown product to an offered product profile at a point of sale. The method comprises obtaining a sensory input from the unknown product, wherein the sensory input comprises at least a portion of an image, assigning a value to one or more characteristics of the sensory input, searching a product repository for a matching product profile using a pre-defined range based on the value of the one or more characteristics of the sensory input, identifying the matching product profile on the product repository when the offered product profile is within the pre-defined range, wherein the matching product profile comprises product information data, and conducting a transaction at the point of sale using the product information data.

In general, in one aspect, the invention relates to a system for matching an unknown product to an offered product profile at a point of sale. The system comprises a product repository comprising: an offered product profile and a matching product profile, wherein the matching product profile comprises product information data, a point of sale (POS) terminal configured with functionality to: obtain a sensory input from the unknown product, wherein the sensory input comprises at least a portion of an image, and conduct a transaction at the point of sale using the plurality of product information data, and a product analysis module configured with functionality to: assign a value to one or more characteristics of the sensory input, search the product repository for the matching product profile using a pre-defined range based on the value of the one or more characteristics of the sensory input, and identify the matching product profile on the product repository when the offered product profile is within the pre-defined range.

In general, in one aspect, the invention relates to a computer readable medium storing instructions to match an unknown product to an offered product profile at a point of sale. The instructions comprising functionality for: obtaining a sensory input from the unknown product, wherein the sensory input comprises at least a portion of an image, assigning a value to one or more characteristics of the sensory input, searching a product repository for a matching product profile using a pre-defined range based on the value of the one or more characteristics of the sensory input, identifying the matching product profile on the product repository when the offered product profile is within the pre-defined range, wherein the matching product profile comprises product information data, and conducting a transaction at the point of sale using the product information data.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to conducting a search query for product information using an image. More specifically, one or more embodiments of the invention relate to obtaining an image of an unknown product, assigning a value to a characteristic of the image to create an unknown product profile, searching a first product repository for a matching product profile with a value for the same characteristic within a pre-defined range, and generating an invoice using product identification data from the matching product profile.

Figure 1:
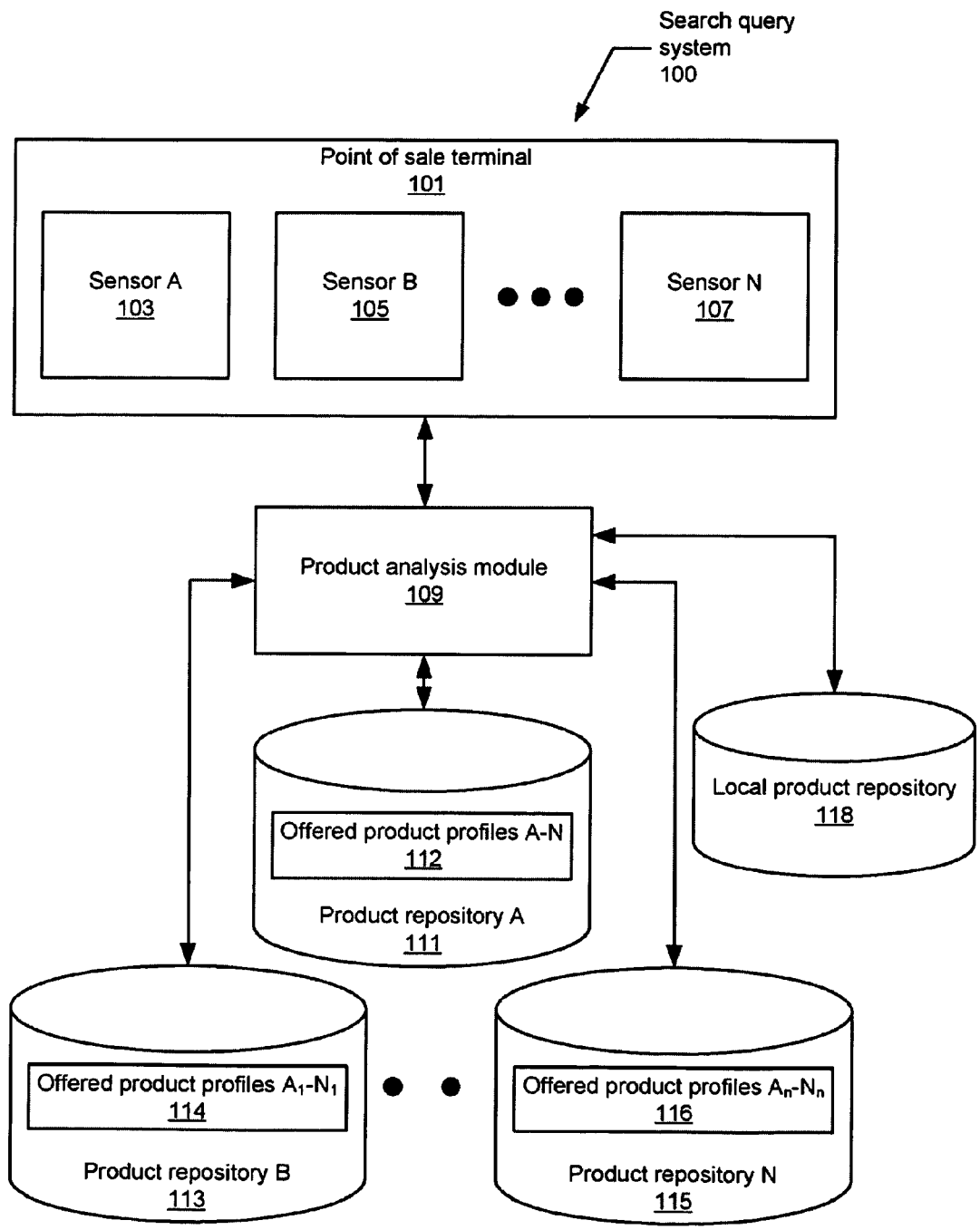
FIG. 1 shows a system diagram in accordance with one or more embodiments of the invention.

FIG. 1 shows a system (100) in accordance with one or more embodiments of the invention. As shown in FIG. 1, the system (100) includes a point of sale (POS) terminal (101), a product analysis module (109), an optional local product repository (118), and at least one offered product profile (e.g. product repository A (111)) stored on a product repository. Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments.

In one or more embodiments of the invention, the system (100) is implemented using a client-server topology. The system (100) itself may correspond to an enterprise application running on one or more servers, and in some embodiments could be a peer-to-peer system, or resident upon a single computing system. In addition, the system (100) is accessible from other machines using one or more interfaces (not shown). In one or more embodiments of the invention, the system (100) is accessible over a network connection (not shown), such as the Internet, by one or more users. Information and/or services provided by the system (100) may also be stored and accessed over the network connection.

Continuing with FIG. 1, the point of sale (POS) terminal (101) corresponds to a process, program, and/or system that includes functionality to obtain sensory input associated with an unknown product and generate an invoice for sale of a product, in accordance with one or more embodiments of the invention. The term product, as used herein, refers to any consumer good or service, including groceries, merchandise, photo finishing, food preparation, baked goods, medications, or other consumable items. In one or more embodiments of the invention, the POS terminal (101) includes functionality to obtain sensory input from an unknown product using one or more sensors (e.g., sensor A (103), sensor B (105), and sensor C (107)). In one or more embodiments of the invention, this sensory input is an image. In one or more embodiments, the image is captured using a digital camera (e.g., Sensor A (103)) with a resolution of at least one mega pixel. In one or more embodiments of the invention, the image is a three dimensional image. For example, sensor A (103) may be a digital imaging system capable of creating 3D images, such as using a prism/mirror optical setup. In one or more embodiments of the invention, the POS terminal (101) includes lighting elements sufficient to ensure clear images may be captured using the particular sensor(s).

In one or more embodiments of the invention, overlapping images (e.g. imaged captured by Sensors A (103) and B (105)) may be combined to create a 2D image, which can be mapped to a 3D image using known techniques. In one or more embodiments of the invention, additional overlapping images from other sensors (e.g., sensor B (105), sensor N (107)) may be used to create a 3D image using triangulation of the image data within the overlapping fields of view. In one or more embodiments of the invention, software may be implemented to calibrate the camera parameters, download the images from the digital camera (for example, via a USB link, a wireless connection, or other means), reconstruct the 3D models, stitch the models together, and display the models. Those skilled in the art will appreciate that the digital imaging component of the system (100) may take other forms now known or later developed.

In or more embodiments of the invention, sensory input is non-visual. For example, the sensory input could include weight, refraction, chemical composition, molecular structure, temperature, pH, affinity, molecular binding, reactivity, an emission, density, viscosity, sound, smell, a plurality of genetic markers, feel, taste, a thermal quality, an electrical quality, mass, and quantitative descriptive analysis. Accordingly, additional sensors (e.g., sensor B (105), sensor N (107)) could include functionality to measure these types of sensory input, for example, a scale, thermometer, pH probe, binding assay, glucose test, mass spectrometry, conductivity meter, ultrasound, chromatography, thermal or electrical conductivity apparatus, melting/boiling/freezing point gauge, radiofrequency receptor, and nuclear magnetic resonance apparatus. Those skilled in the art will appreciate that the non-visual sensory input component of the system (100) may take other forms now known or later developed.

In one or more embodiments of the invention, the POS terminal may include additional functionality, such as functionality to scan a whole or partial bar code on an item, determine the price associated with the item, and/or collect payment of the price for the sale of the item. In another example, the POS terminal may include functionality to collect payment for services by a consumer.

In one or more embodiments of the invention, the product analysis module (109) is configured to transmit and receive information from the POS terminal. In one or more embodiments of the invention, the POS terminal may be configured to transmit and receive information to a user, for example, as a POS terminal operator, customer service representative, store employee (or manager), customer, facility employee, inventory specialist, etc.

The system includes a product analysis module (109) that captures sensory input associated with an unknown product from one or more sensors in the POS terminal (e.g., sensor A (103), sensor B (105), sensor N (107)), extracts information from the sensory input, mathematically characterizes the sensory input, and mathematically compares that data to comparable data for known products. In one or more embodiments of the invention, this sensory input is image data. As used herein, the term "image data" is intended to mean data that corresponds to or is based on discrete portions of a captured image. For example, with digital images, such as those provided in a Joint Photographic Experts Group (JPEG) format, the image data may correspond to data or information about pixels that form the image, or data or information determined from pixels of the image. Another example of "image data" is signature or other non-textual data that represents a classification or identity of an object, as well as a global or local feature. In one or more embodiments of the invention, the product module may procure the image, segment the image, extract features, and generate a profile based on the extracted features.

In performing various analysis operations, the system (100) may determine and/or use information that is descriptive or identifiable to objects shown in the images of the unknown product. For example, the system (100) may analyze image data by (i) recognizing or otherwise determining information about an object contained in an image through an analysis of image data, text data, metadata, or any combination thereof, and/or (ii) recognizing or otherwise determining information about an object using existing or known information from a source other than the image data. The information about the unknown product contained in the image may correspond to one or more classifications (e.g. "produce," "apple," or "organic apple"), determination of type (e.g. variety or brand identification), characteristic information (e.g., color, pattern, shape), and/or information that is sufficiently specific to identify the object for purposes of generating a sales invoice. In order to programmatically determine information about the image of the unknown product, one or more embodiments determine the information about the object(s) in the image using image analysis and recognition, text analysis (e.g., labels containing product and manufacturer information), bar code data (e.g., a partially readable bar code), human input (e.g., POS terminal operator may enter a keyword associated with the unknown product), or a combination thereof. In this way, the product analysis module (109) may use both information determined from the source and existing or known information from a source other than the image data. The terms "recognize", or "recognition", or variants thereof, in the context of an image or image data (e.g. "recognize an image") means that a determination is made as to what the image correlates to, represents, identifies, means, and/or a context provided by the image. Recognition does not mean a determination of identity by name, unless stated so expressly, as name identification may require an additional step of correlation.

In one or more embodiments of the invention, the system (100) is required to determine information about the unknown product before or independent of image recognition/analysis processes that are performed. In one or more embodiments, the POS terminal (101) attempts to read bar code data on the unknown product via a barcode reader or other sensor (e.g., sensor A (103), sensor B (105), sensor N (107)), and provides all data (e.g. a partial barcode).

In one or more embodiments of the invention, the product analysis module (109) attempts to capture label information from the image. In one or more embodiments, the POS terminal (101) obtains alternative sensory input, for example the weight of the unknown product, via a second sensor (e.g. sensor 13 (105)) and transmits that data to the product analysis module (109).

In one or more embodiments of the invention, the POS terminal (101) may include an interface seeking input from the operator (e.g. a keyword or product category descriptive of the unknown product, protocol for removing a single piece of produce from the bag to capture the image, or protocol for consistent placement of unknown products on the sensor(s) (e.g., sensor A (103), sensor B (105), sensor N (107)). Those skilled in the art will appreciate that many different kinds of non-image or image-related information may be considered when analyzing the identity or physical properties of the unknown product.

The product analysis module (109) receives the image data of the sensory input from the POS terminal (101). In one or more embodiments of the invention, the product analysis module (109) segments the image data into a foreground image and a background image, with the foreground image corresponding to a segmented image. As mentioned above, one or more embodiments provide that the product analysis module (109) receives or uses certain a priori knowledge in segmenting a segmented image from the background. Thus, for example, the product analysis module (109) may know to segment an image to separate a single apple from the other contents in the background.

In one or more embodiments of the invention, the product analysis module (109) may segment foreground objects from other foreground objects. For example, the product analysis module (109) may segment an unknown can of soup into a label portion, and top and bottom of the can portions. The product analysis module (109) may implement this function using one of many foreground/background segmentation algorithms. In one or more embodiments of the invention, a background is assumed to be at the sides of the images, whereas the foreground can be assumed to be at the center. The intensity distribution of both foreground and background can be obtained from the center and side pixels respectively. For example, a mixture of Gaussian models can be learned for the foreground and background pixels. Such models may be applied to the whole image and each pixel may be classified as foreground and background. As an addition or alternative, the foreground and background may be determined by doing a statistical analysis of pixel distributions on the image.

The product analysis module (109) extracts features from the segmented image. In one or more embodiments of the invention, data provided as a result of the feature extraction may include data that is descriptive of particular aspects or characteristics of segmented image, as well as of the segmented image as a whole. Certain features may be extracted that are class-specific descriptors that apply to the image object as a whole, such as primary color, patterns, shape, and texture. In one or more embodiments of the invention, the product analysis module (109) determines "local features", meaning those features that are localized to a specific part or portion of the segmented image. In one or more embodiments of the invention, the regions can be selected by random sampling on the image. In one or more embodiments of the invention, global and local features are used for different types of visual search processes for an item. For example, in the global case, a search process may seek to match an overall appearance of an object to a specific feature that is provided in the search input. In the local case, for example, a search process may seek a match of an object that has similar characteristics in a selected or specific area.

The product analysis module (109) analyzes the image data to create a visual signature (or signatures) for the unknown product. In one or more embodiments of the invention, Digital Image Processing (DIP) techniques may be used to analyze an image for the purpose of creating a signature of the image. For example, image histogram and color histogram analysis may be used. Edge detection, line transform, interest point analysis, blob detection, corner detection, gray-scale histogram, texture mapping, curvature detection, spatial analysis, and other well-known DIP techniques may also be used along with specific algorithms to produce values that can be included in a signature of the image.

In one or more embodiments of the invention, the product analysis module (109) may use mathematical routines like averaging, multiplication, division, and quantification in conjunction with image analysis to help create single values for DIP categories. For example, color analysis may include color intensity averages, contrast averages, color palette analysis, and other analysis as deemed necessary. Static information about the image such as pixel count, resolution, and any other data that remains identical from image to image because of conversion to a standard format may be filtered out or ignored altogether to focus on the differences from image to image. In one or more embodiments of the invention, each process in image analysis used to create a signature value for an image should be accurate enough produce the same or near the same value if run on the same image a second time. A margin for error may be acceptable for each DIP function and the margin may be accumulative in overall processing so long as one may still match within reason a single image to the same image using a signature map and a 100% (or near to) constraint matching criteria.

In one or more embodiments of the invention, the detection and determination of features (global and local) may be represented either quantifiably or by text. The product analysis module (109) may include components (e.g., vectors, text, etc.) for recording both kinds of data. For example, data may take the form of vectors that carry values that identify or are descriptive of various features. The product analysis module (109) may use detected features represented by feature data to generate a vector representation of a set of features for a particular object item. The vector representation may include one or more signatures, which may be generated for a particular segmented image. One segmented image may have multiple signatures, for one or more local features and/or global features, or alternatively one signature that is representative of the one or more local and/or global features. The signature(s) of a particular image object may identify the given object (or a portion of an object) either uniquely or by a set of class-specific characteristics.

In one or more embodiments of the invention, the product analysis module (109) indexes the signature(s) and other data collected for the unknown product and its image to generate an unknown product profile (not shown). The unknown product profile may carry data that is the result of recognition or image analysis processes. Subsequent searches may specify or use image data provided in the unknown product profile.

In one or more embodiments of the invention, the product analysis module (109) may analyze image data to determine information that may suffice as the object identifier. The product analysis module (109) may operate on either pixilated data or quantified data. For example, some shape recognition process may be performed on the result of the image to classify the object as a "canned item." Once classified, such an embodiment enables the product analysis module (109) to extract features that are specific to canned goods, such as label information and can configurations.

In one or more embodiments, the product analysis module (109) may incorporate textual hints and "learning" algorithms to increase accuracy and discern the subjective concept of the search target.

The product analysis module (109) may compare the data from the unknown product profile to that of offered products. In one or more embodiments of the invention, offered product profiles (e.g. offered product profiles A-N (112)) are stored in a product repository (e.g. product repository A (111)) that may be accessed and searched by the product analysis module (109). In one or more embodiments of the invention, multiple product repositories (e.g. product repositories B-N (113, 115)) may be used. For example, the product analysis module (109) may be programmed to search several product repositories, either in succession or simultaneously. In one or more embodiments, the system (100) may also include a local product repository (112), which is discussed below.

In one or more embodiments of the invention, a local product repository (112) may be populated with data from an unknown product profile and a matching product profile for an offered product based on a search. For example, if a matching product profile is found in a distributor product repository (e.g. product repository A (111)), the system may store all information from a successful search query in a local product repository (112). In one or more embodiments of the invention, future searches may be conducted first in the local product repository (112) and, if no match is found, a second search may be conducted in one or more other product repositories (e.g. product repository A (111), product repository B (113), product repository N (115)). In one or more embodiments of the invention, the local product repository (112) may be maintained solely for inventory purposes.

In one or more embodiments of the invention, the product repository (e.g., product repository A (111)) includes functionality to store digital images of offered products in association with product identification data. In one or more embodiments of the invention, access to the product repository (e.g., product repository A (111)) is restricted and/or secured. As such, access to the product repository (e.g., product repository A (111)) may require authentication using passwords, secret questions, personal identification numbers (PINs), biometrics, and/or any other suitable authentication mechanism.

Those skilled in the art will appreciate that elements or various portions of data stored in the product repository (e.g., product repository A (111)) may be distributed and stored in multiple data repositories. In one or more embodiments of the invention, the product repository (e.g., product repository A (111)) is flat, hierarchical, network based, relational, dimensional, object modeled, or structured otherwise. For example, the product repository (e.g., product repository A (111)) may be maintained as a table of a Simple Query Language (SQL) database or a simple spreadsheet. In addition, data in the product repository (e.g., product repository A (111)) may be verified against data stored in other product repositories (e.g., product repository B (113), product repository N (115)).

Figure 2A:
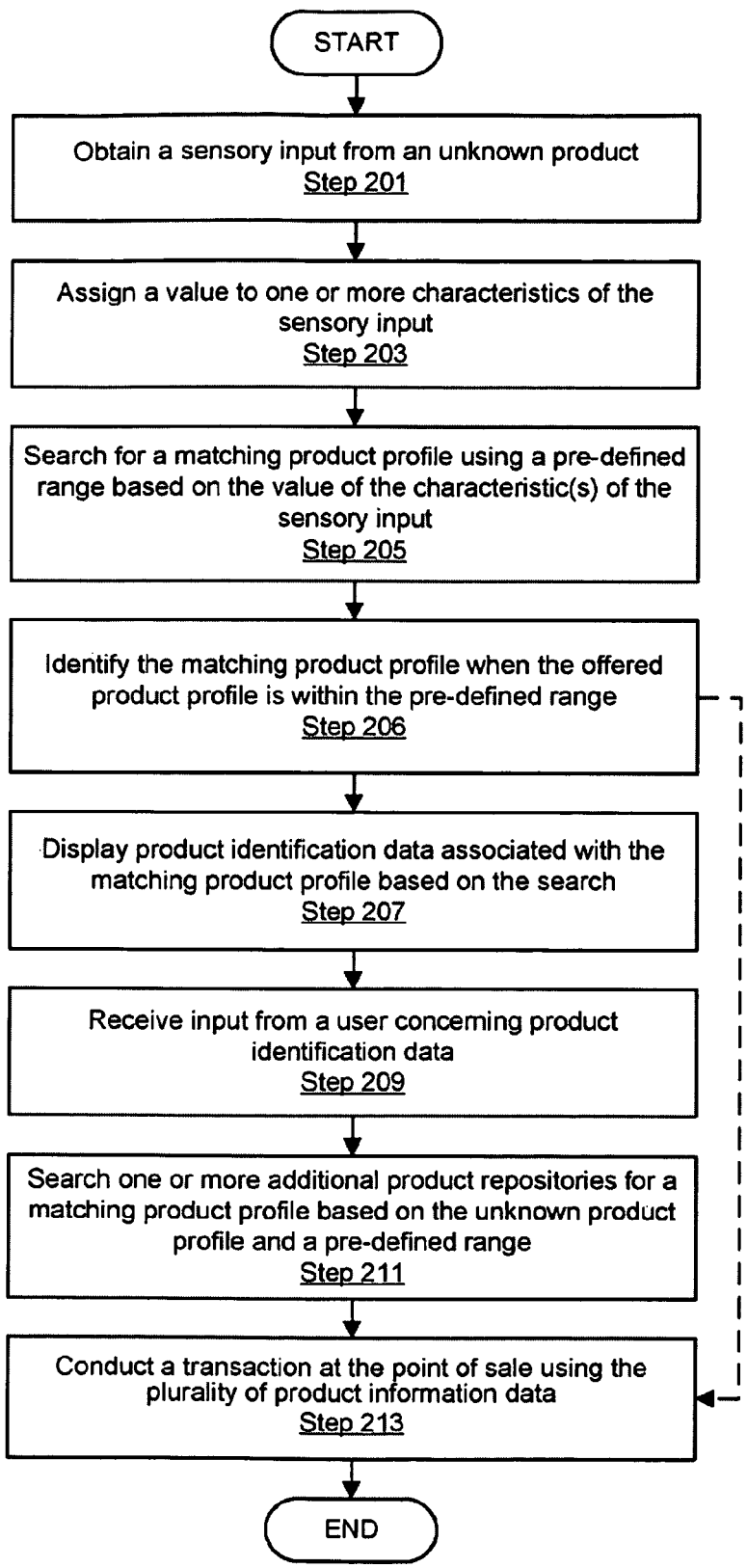
FIGS. 2A-2B and FIG. 3 show flowcharts of a method for matching an unknown product to an offered product profile at a point of sale in accordance with one or more embodiments of the invention.

FIG. 2A shows a flowchart of a method for matching an unknown product to an offered product profile at a point of sale in accordance with one or more embodiments of the invention. In one or more embodiments, one or more of the steps shown in FIG. 2A may be omitted, repeated, and/or performed in a different order than the order shown in FIG. 2A. Accordingly, the specific arrangement of steps shown in FIG. 2A should not be construed as limiting the scope of the invention.

In Step 201, sensory input is obtained from an unknown product. In one or more embodiments of the invention, the sensory input is at least a portion of an image and the search is conducted using image data. In one or more embodiments of the invention, the search is conducted using at least a portion of an image and text (e.g., a keyword entered by the user, text captured from a product label) data. In one or more embodiments of the invention, the sensory input is non-visual. For example, the sensory input may include weight, chemical composition, molecular structure, temperature, pH, affinity, molecular binding, reactivity, an emission, density, viscosity, sound, smell, a plurality of genetic markers, feel, taste, a thermal quality, an electrical quality, mass, and quantitative descriptive analysis. In one or more embodiments of the invention, two or more sensory inputs are obtained and analyzed concurrently or discretely prior to conducting a search query. In one or more embodiments of the invention, non-sensory information is included in the unknown product profile for the initial search query.

Figure 2B:
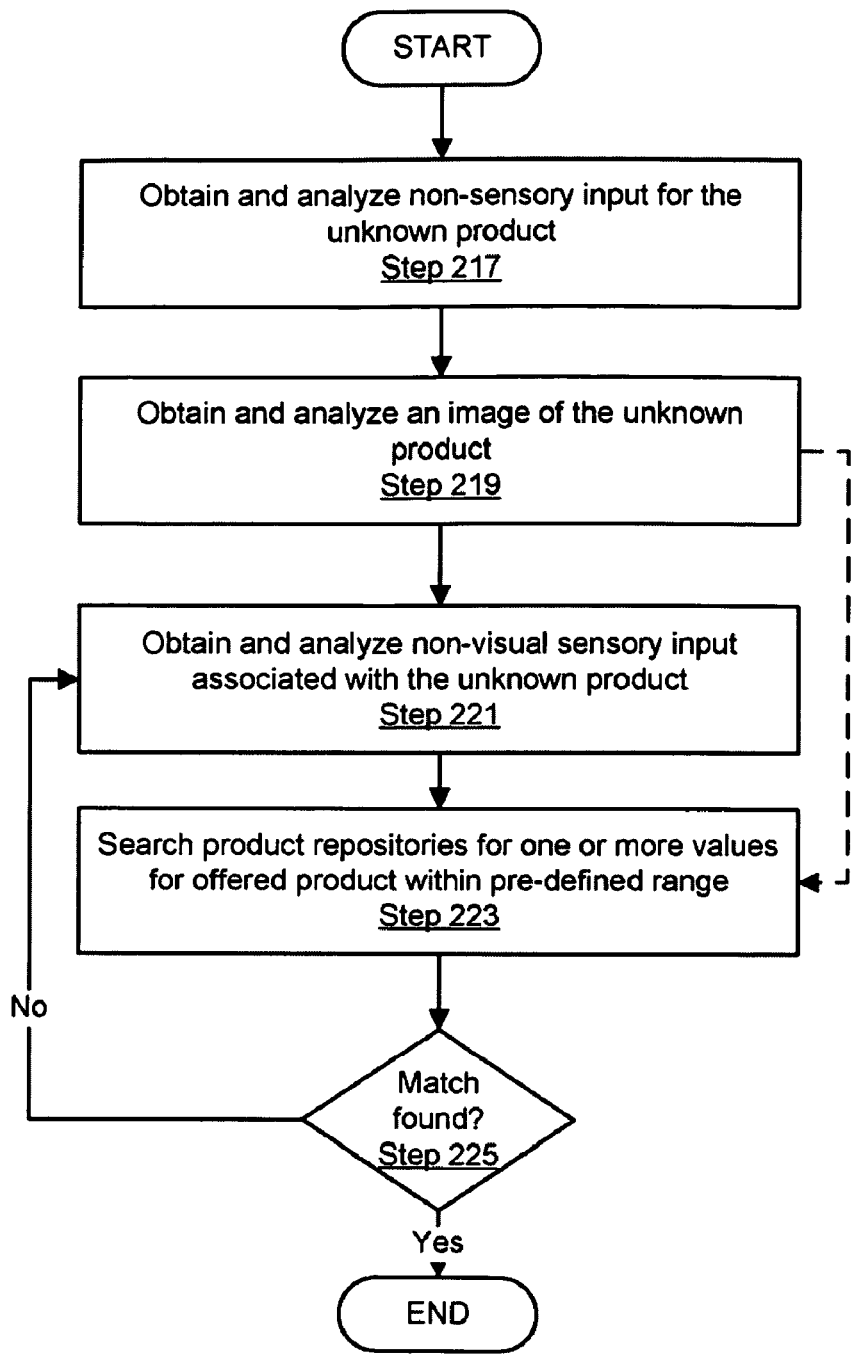

There are numerous ways to obtain and analyze sensory input to conduct a product search in accordance with one or more embodiments of the invention. FIG. 2B, for example, shows a flow chart of possible routes to obtain sensory input to conduct a search query for product information in accordance with one or more embodiments of the invention. In one or more embodiments of the invention, as shown in Step 217, the system is required to determine non-sensory information about the unknown product before or independent of image recognition and sensory analysis processes that are performed. For example, the system may first conduct a search based on a partial barcode from the unknown product or a keyword or category entered by the POS terminal operator. In one or more embodiments of the invention, the system may obtain and analyze non-sensory information after a search based on image data is unsuccessful.

In one or more embodiments of the invention, as shown in Steps 219 and 221, a search query may be conducted using values obtained from at least two sensory inputs. For example, the unknown property profile upon which the search is based may contain both a visual signature and weight value for the unknown product. As shown in Steps 219 and 223, in one or more embodiments of the invention, a second sensory input for the unknown product may not be obtained and incorporated into the search query until after a search based on image data is unsuccessful.

In one or more embodiments of the invention, as shown in Step 223, sensory input for the unknown product may be obtained from multiple sensors and, in some cases, analyzed in an initial step, and comparative searches may be done using some or all of the data simultaneously or successively. Those skilled in the art will appreciate that the search conducted using this system and method may take many forms without departing from the spirit and scope of this invention.

Returning to FIG. 2A, in Step 203, a value is assigned to each characteristic of one or more categories of sensory input to obtain an unknown product profile. A process for assigning values for sensory input is discussed in detail in previous portions of the specification. In one or more embodiments of the invention, the sensory input is an image. For example, the image may be analyzed using existing DIP processes for detecting image characteristics and assigning, deriving, and/or extrapolating values that can be used in creating a visual signature. A visual signature is created from the derived values defining various characteristics (e.g. color, shape, texture, object, line shape, etc.) that vary from image to image. Mathematical processing may be performed on categorical values (e.g. vectors may be quantified and averaged to reflect an overall value). Data compression or encoding techniques may be used to produce a value for a specific characteristic as long as those same routines are repeated, image for image, on the specific characteristic that is analyzed.

In one or more embodiments of the invention, the visual signature may be a machine readable code having multiple values representing different characteristics of the analyzed image ordered in presentation so that they may be read the same way during visual signature matching. In one or more embodiments of the invention, a visual signature may be a concatenated binary string of ordered values. Those skilled in the art skilled will appreciate that the digital imaging process may take other forms now known or later developed.

In Step 205, a search query based on the characteristic value(s) in the unknown product profile is conducted. In one or more embodiments, the search takes place in the product repository and the data from the offered product profiles may be clustered in order to reduce search times. For example, the visual signature of the unknown product may first be matched to visual signatures of offered products in a similar cluster, then a comparative search is only conducted with the offered product profiles in that cluster. Alternatively, a second sensory (e.g. weight) or non-sensory (e.g. keyword input by POS terminal operator) input may first be matched to offered products in a similar cluster, then a comparative search of visual signatures is conducted with the offered product profiles in that cluster. Those skilled in the art will appreciate that the search may be conducted in numerous ways without departing from the spirit and scope of this invention.

The product repository may be populated by the operator or an agent of the operator, such as an inventory department or main office. In one or more embodiments of the invention, a third party (e.g. manufacturer, distributor, etc.) populates the product repository. In one or more embodiments of the invention, the system may search offered product profiles located in multiple product profiles, including local and third party repositories.

In one or more embodiments of the invention, the merchant populates the product repository as part of product receiving or inventory. For example, the product repository may be populated by the merchant that is selling the unknown product. In one or more embodiments of the invention, the merchant may update the product repository after manually obtaining the product identification data. For example, after an unsuccessful search of a first product repository based on one or more sensory inputs, an employee may manually obtain (e.g. via a price check or description in a store advertisement) and enter the product identification data into the POS terminal. The manually entered data may be saved with the sensory input to the product repository. In one or more embodiments of the invention, an authorized person (e.g. store manager, product expert, or database manager) reviews the unmatched sensory input and manually entered data to determine whether this information should be included in the product repository.

Figure 3:
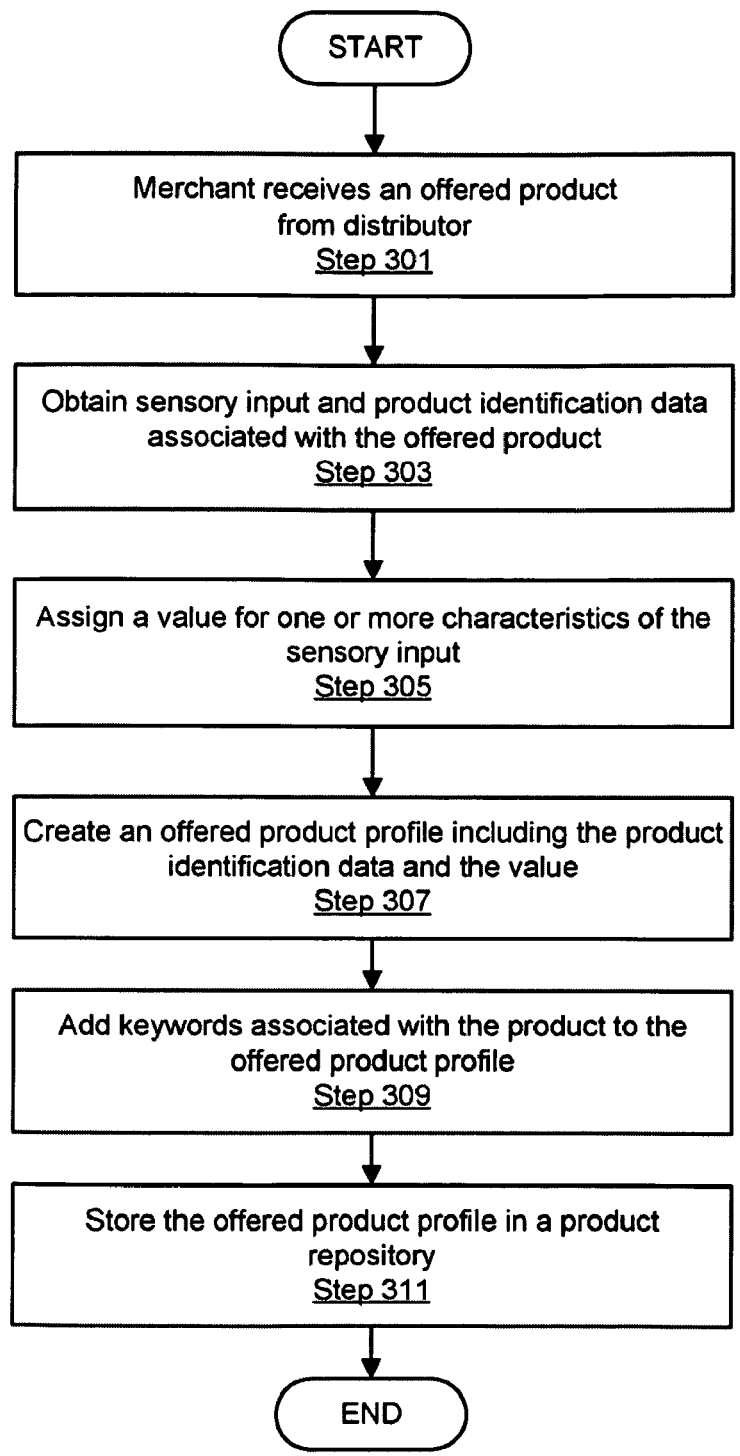

FIG. 3 shows a flow chart for populating a product profile repository in accordance with one or more embodiments of the invention. In Step 301, the merchant receives a shipment of offered products from the distributor. In Step 303, the merchant obtains sensory input (e.g., image data and/or non-visual sensory data) from a unit of the offered product and product identification data (e.g., bar code information). In Step 305, a value is assigned to each characteristic of the sensory input, as described in detail earlier in the specification. In Step 307, this data is used to create an offered product profile. As shown in Step 309, in one or more embodiments of the invention, keywords associated with the offered product are also stored in offered product profile in searchable format. In Step 311, the offered product profile is stored in a product repository.

In one or more embodiments of the invention, the sensory input, characteristic values, and/or product identification data may be obtained from other sources and incorporated into the product repository by the merchant, an agent of the merchant, or a third party.

Returning to FIG. 2A, in Step 205, the offered product profiles (which may be stored in the product repository) are searched and compared to the unknown product profile to obtain a matching product profile.

Further, in Step 206, the matching product profile is identified when the offered product profile is within a pre-defined range. In one or more embodiments of the invention, a pre-defined range of acceptable variation may be set as a search constraint. A search constraint may identify a percentage or range of percentages prioritized in the results listing. For example, a user may specify that all results returned should match the submitted visual signature by 80 percent, the submitted weight by 95 percent, and so on. The pre-defined range may be uniform to all categories of sensory input, or individual to each category, for example, based on the accuracy of the associated sensor(s) or variations in product appearance or other characteristics. In one or more embodiments of the invention, a matching product profile is defined as having a value(s) for a matching characteristic(s) within the pre-defined range of the value(s) in the unknown product profile.

In one or more embodiments of the invention, as shown in Step 213, a transaction is conducted at the point of sale using the plurality of product information data. Additionally, an invoice may be generated using the same product identification data. Optionally, in one or more embodiments of the invention, product identification data associated with matching product profile is first displayed by the POS terminal, as shown in Step 207. In Step 209, the system may seek input from a user (e.g., a POS terminal operator, a consumer, inventory specialist, etc.) concerning the product identification data. For example, the system may include an interface that requires the user to accept the product identification before the system includes that information as part of a line item.

As shown in Step 211, in one or more embodiments, the system may include an interface that allows the user to reject the product identification, requiring the system to conduct one or more additional searches (e.g., searching one or more additional product repositories, or conducting a second search of the first product repository using one or more additional sensory input value(s) or non-sensory input).

In one or more embodiments of the invention, the user may be prompted to enter keywords associated with the unknown product. For example, the interface may require that the user enter category (e.g. "produce") or a descriptive ("red, organic, apple") text. In one or more embodiments of the invention, this step takes place before the first search query is run (e.g. the text is used to identify a relevant cluster in the properties repository prior to a comparison of visual signatures). In one or more embodiments of the invention, keyword text is used in a search subsequent to a search based on one or more sensory input analyses. In one or more embodiments of the invention, text and sensory input are used concurrently to conduct a search query. Those skilled in the art will appreciate that the search may be conducted in numerous ways without departing from the spirit and scope of this invention.

In Step 213, a transaction is conducted at the point of sale using the plurality of product information data. Additionally, the product identification data from the matching product profile may be used to generate an invoice. An invoice may include, for example, a bill, a line item charge, a price quote, statement, bill of goods, bill of lading, bill of shipment, receipt, manifest, itemized account, checklist, inventory, reckoning, request for payment, or statement of account. The invoice may be displayed, stored, printed, transmitted, or otherwise provided to the user (e.g. the POS terminal operator) and/or the product purchaser.

Figure 4:
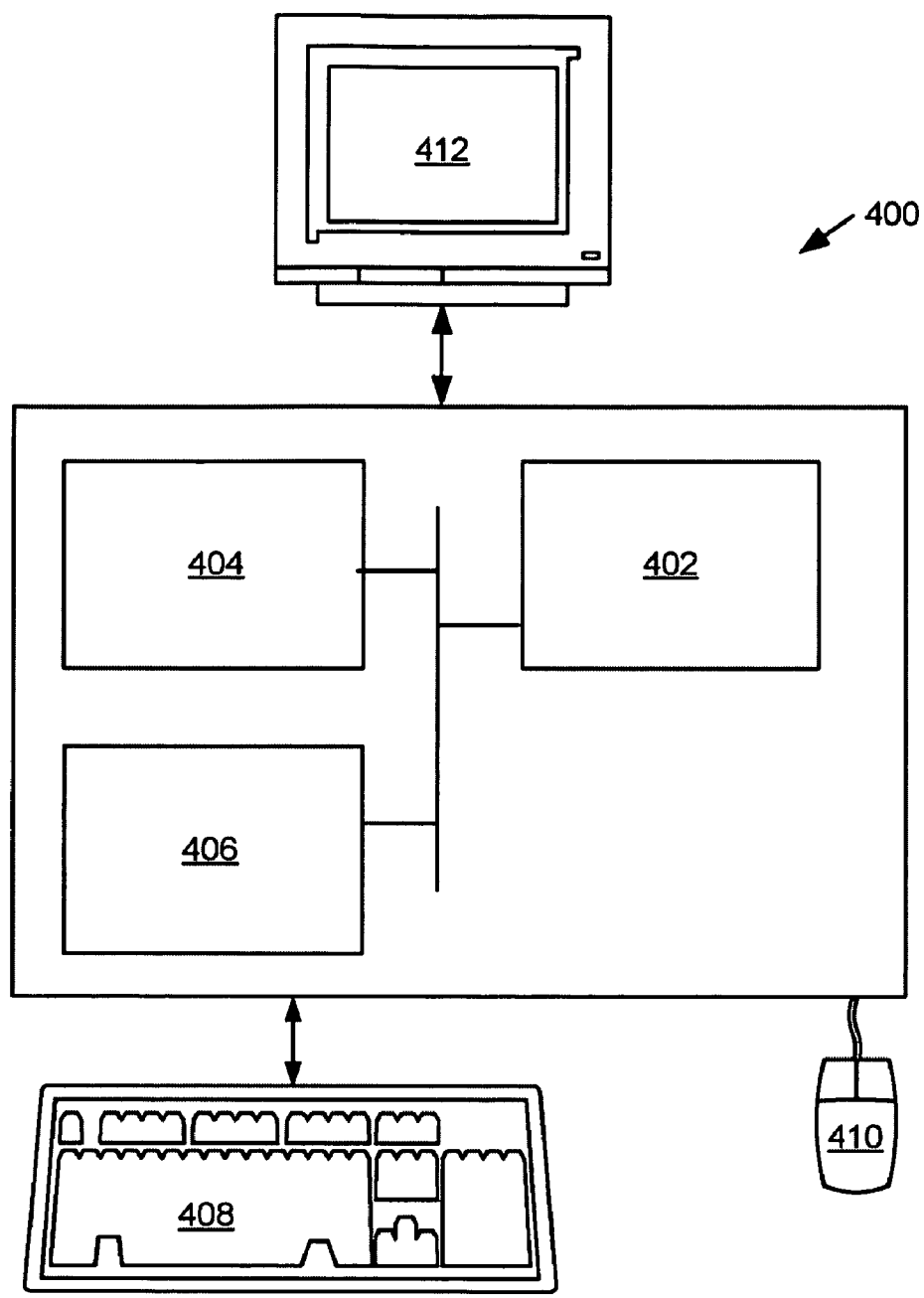
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (508), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

One with skill in the art of data searching will recognize that the methods and system of the present invention may be used to provide a wide array of services. For example, this invention would be useful across multiple industries for purposes of inventory management and control. In the context of healthcare (e.g., healthcare product manufacturers and distributors, hospitals, pharmacies, physicians, and clinics), the system could additionally be used to track distribution prescription drug inventory for purposes of recalls or regulatory compliance (e.g. Food and Drug Agency, Drug Enforcement Agency, Center for Medicare Services, or National Institute of Health tracking requirements), quality control (e.g. to confirm proper medications given to clients or identify errors), and for research (e.g. distribution of experimental treatments in blinded clinical trials).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method identifying a product at a point of sale (POS), comprising:
    obtaining a first digital image and a second digital image of an unknown product;
    generating, by the computer processor, a 3D image of the unknown product using the first digital image and the second digital image;
    obtaining an electrical conductivity of the unknown product;
    searching, by the computer processor, a product repository for the 3D image and the electrical conductivity to identify the product that matches the unknown product, wherein the product comprises a name and a price; and
    selling the product for the price at the POS.

2. The method of claim 1, further comprising:
    generating an invoice comprising the name and the price at the POS for a sale of the product.

3. The method of claim 1, further comprising:
    obtaining a chemical composition of the unknown product; and
    searching the product repository for the chemical composition to identify the product.

4. The method of claim 1, further comprising:
    displaying a plurality of product identification data of the product; and
    obtaining a user approval of the plurality of product identification data.

5. The method of claim 1, further comprising:
    obtaining a molecular structure of the unknown product; and
    searching the product repository for the molecular structure to identify the product.

6. The method of claim 1, further comprising:
    obtaining a temperature of the unknown product; and
    searching the product repository for the temperature to identify the product.

7. The method of claim 1, further comprising:
    obtaining a pH signature of the unknown product; and
    searching the product repository for the pH signature to identify the product.

8. The method of claim 1, further comprising:
    obtaining a chemical affinity signature of the unknown product; and
    searching the product repository for the chemical affinity signature to identify the product.

9. The method of claim 1, further comprising:
    obtaining a molecular binding signature of the unknown product; and searching the product repository for the molecular binding signature to identify the product.

10. The method of claim 1, further comprising:
obtaining a reactivity signature of the unknown product; and
searching the product repository for the reactivity signature to identify the product.

11. The method of claim 1, further comprising:
obtaining a density of the unknown product; and
searching the product repository for the density to identify the product.

12. The method of claim 1, further comprising:
obtaining a viscosity of the unknown product; and
searching the product repository for the viscosity to identify the product.

13. The method of claim 1, further comprising:
obtaining a genetic marker of the unknown product; and
searching the product repository for the genetic marker to identify the product.

14. The method of claim 1, further comprising:
obtaining a thermal signature of the unknown product; and
searching the product repository for the thermal signature to identify the product.

15. The method of claim 1, further comprising:
obtaining a mass of the unknown product; and
searching the product repository for the mass to identify the product.

16. The method of claim 1, further comprising:
obtaining a radioactivity of the unknown product; and
searching the product repository for the radioactivity to identify the product.

17. The method of claim 1, further comprising:
obtaining a partial barcode of the unknown product;
searching the product repository for the partial barcode; and
failing to identify the product.

18. A non-transitory computer readable storage medium storing instructions for identifying a product at a point of sale (POS), the instructions comprising functionality for:
obtaining a first digital image and a second digital image of an unknown product;
generating a 3D image of the unknown product using the first digital image and the second digital image;
obtaining an electrical conductivity of the unknown product;
searching a product repository for the 3D image and the electrical conductivity to identify the product that matches the unknown product, wherein the product comprises a name and a price; and
selling the product for the price at the POS.

19. The non-transitory computer readable storage medium of claim 18, the instructions further comprising functionality for:
obtaining a molecular structure of the unknown product; and
searching the product repository for the molecular structure to identify the product.

20. The non-transitory computer readable storage medium of claim 18, the instructions further comprising functionality for:
obtaining a genetic marker of the unknown product; and
searching the product repository for the genetic marker to identify the product.

21. The non-transitory computer readable storage medium of claim 18, the instructions further comprising functionality for:
obtaining a partial barcode of the unknown product;
searching the product repository for the partial barcode; and
failing to identify the product.

22. A system for identifying a product at a point of sale (POS), comprising:
the POS operatively connected to a processor and configured to:
obtain a first digital image and a second digital image of an unknown product;
generate a 3D image of the unknown product using the first digital image and the second digital image;
obtain an electrical conductivity of the unknown product;
search a product repository for the 3D image and the electrical conductivity to identify the product that matches the unknown product, wherein the product comprises a name and a price; and
sell the product for the price at the POS.

23. The system of claim 22, wherein the POS is further configured to:
obtain a molecular structure of the unknown product; and
search the product repository for the molecular structure to identify the product.

24. The system of claim 22, wherein the POS is further configured to:
obtain a genetic marker of the unknown product; and
search the product repository for the genetic marker to identify the product.

25. The system of claim 22, wherein the POS is further configured to:
obtain a partial barcode of the unknown product;
search the product repository for the partial barcode; and
fail to identify the product.

* * * * *

UNITED STATES PATENT AND TRADEMARK OFFICE
CERTIFICATE OF CORRECTION

| | |
|---|---|
| PATENT NO. | : 8,117,071 B1 |
| APPLICATION NO. | : 12/112545 |
| DATED | : February 14, 2012 |
| INVENTOR(S) | : Todd Matthew Fitch et al. |

Page 1 of 1

It is certified that error appears in the above-identified patent and that said Letters Patent is hereby corrected as shown below:

- In Claim 1, Column 12 (line 20), --for-- should be added after "method".

Signed and Sealed this
Tenth Day of April, 2012

David J. Kappos
*Director of the United States Patent and Trademark Office*